(12) United States Patent
Itano

(10) Patent No.: US 8,291,888 B2
(45) Date of Patent: Oct. 23, 2012

(54) SPEED DEPENDENT KNOCK CONTROL

(75) Inventor: Edwin Itano, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 931 days.

(21) Appl. No.: 12/201,787

(22) Filed: Aug. 29, 2008

(65) Prior Publication Data
US 2010/0018500 A1 Jan. 28, 2010

Related U.S. Application Data

(63) Continuation-in-part of application No. 12/179,268, filed on Jul. 24, 2008, now abandoned.

(51) Int. Cl.
F02P 5/00 (2006.01)
F02P 5/06 (2006.01)

(52) U.S. Cl. ............ 123/406.38; 123/406.33; 701/111

(58) Field of Classification Search ............ 123/406.34, 123/406.37, 406.38, 406.24, 406.29, 674, 123/406.14, 406.16, 406.21, 406.33, 406.39; 73/114.02–114.14, 35.01–35.09, 35.11; 701/111
See application file for complete search history.

(56) References Cited

U.S. PATENT DOCUMENTS

| | | | |
|---|---|---|---|
| 4,351,281 A * | 9/1982 | Geiger et al. | 123/406.35 |
| 4,363,304 A | 12/1982 | Fritz et al. | |
| 4,426,975 A | 1/1984 | Suzuki et al. | |
| 4,542,727 A | 9/1985 | Britsch et al. | |
| 4,552,110 A * | 11/1985 | Yoshida et al. | 123/406.65 |
| 4,640,250 A * | 2/1987 | Hosaka et al. | 123/406.35 |
| 4,711,212 A * | 12/1987 | Haraguchi et al. | 123/406.38 |
| 4,715,184 A | 12/1987 | Oosawa et al. | |
| 4,793,310 A * | 12/1988 | Komurasaki | 123/406.34 |
| 4,838,228 A | 6/1989 | Yoneyama | |
| 5,027,774 A * | 7/1991 | Dutkiewicz et al. | 123/406.26 |
| 5,058,021 A | 10/1991 | Scott | |
| 5,215,058 A | 6/1993 | Sakakibara et al. | |
| 5,335,744 A | 8/1994 | Takasuka et al. | |
| 5,343,843 A | 9/1994 | Hamren | |
| 5,485,380 A * | 1/1996 | Takasuka et al. | 701/29 |
| 6,012,426 A * | 1/2000 | Blommer | 123/406.38 |
| 6,041,756 A | 3/2000 | Bonne | |
| 6,246,953 B1 * | 6/2001 | Quinn et al. | 701/111 |
| 6,727,812 B2 * | 4/2004 | Sauler et al. | 340/511 |
| 6,814,054 B2 | 11/2004 | Sauler et al. | |
| 7,578,282 B2 * | 8/2009 | Honda | 123/406.34 |
| 7,844,389 B2 * | 11/2010 | Miyashita | 701/111 |
| 2003/0196637 A1 * | 10/2003 | Bergeon et al. | 123/339.14 |

FOREIGN PATENT DOCUMENTS

| | | | |
|---|---|---|---|
| JP | 359153978 A * | 9/1984 | |
| JP | 63-248971 | 10/1988 | |
| JP | 03169763 A * | 7/1991 | |
| JP | 2004-011569 | * 1/2004 | |
| JP | 2006-022716 | 1/2006 | |

* cited by examiner

*Primary Examiner* — Stephen K Cronin
*Assistant Examiner* — Raza Najmuddin
(74) *Attorney, Agent, or Firm* — Plumsea Law Group, LLC; Mark E. Duell

(57) ABSTRACT

A system and method for controlling knock according to vehicle speed is disclosed. A knock control system has at least two settings, a first setting used for a first speed range and a second setting used for a second speed range. In another embodiment, knock may be controlled according to ambient noise measured directly within the motor vehicle.

14 Claims, 10 Drawing Sheets

SPEED DEPENDENT KNOCK CONTROL

CROSS-REFERENCE TO RELATED APPLICATION

This application is a continuation in part of U.S. patent application Ser. No. 12/179,268 filed on Jul. 24, 2008 now abandoned and entitled "Speed Dependent Knock Control", the entirety of which is incorporated herein by reference.

BACKGROUND OF THE INVENTION

1. Field of the Invention

The present invention relates to motor vehicles and in particular to a motor vehicle with a knock control system.

2. Description of Related Art

Suzuki et al. (U.S. Pat. No. 4,426,975) is directed to an ignition timing control system for internal combustion engines. Suzuki teaches a device configured to correct the basic ignition timing in response to knocking in an internal combustion engine. The ignition timing is further modified according to the engine speed. This is done to prevent excessive retarding of the ignition timing and decreasing the torque under low speed operation as well as to prevent exhaust gas temperatures from rising above allowable limits of the system at high speed operations. In other words, Suzuki teaches a system for limiting the amount of ignition timing retard that occurs in response to knocking in order to maintain preferred operating conditions in the engine.

Takasuka (U.S. Pat. No. 5,335,744) is directed to a knock control system for an automobile internal combustion engine. Takasuka teaches a knock control system in combination with an engine that is equipped with traction control. When traction control (to prevent slipping of the wheels) is in process, the fuel mixture supplied to the engine may be lean. If knock control is operating simultaneously, ignition timing retard (caused by knock control) may lead to high temperatures that can degrade catalysts and affect emissions. To prevent this from happening, the Takasuka design includes a method of turning off the knock control to prevent the ignition timing retard so as to further prevent the degradation of components in the air/fuel mixture.

In the Takasuka design, temperatures high enough to degrade components of the air/fuel mixture will generally occur at higher speed ranges. Therefore, in the Takasuka design, knock control may only be turned off if traction control is in process when the engine speed is high. In other words, knock control may be turned off when traction control is in progress and the engine speed is high.

Yoneyama (U.S. Pat. No. 4,838,228) is directed to an engine timing control apparatus that includes a control circuit for calculating an appropriate value for engine ignition timing. The Yoneyama design includes a method for calculating ignition timing in response to knock control sensors. Corrections to the ignition timing to account for knock control are made according to the engine speed and the engine load.

The Yoneyama method uses correction factors that are dependent on the operating condition of the engine and are associated with three knock control regions. The first region is an unnecessary knock control region that occurs for low engine speeds and low engine loads. The second region is a necessary knock control region that occurs for intermediate engine speeds and loads. The third region is an impossible knock control region that occurs for high engine speeds and loads. In the unnecessary knock control region knock control is not used because knock will generally not occur in this region. In the necessary knock control region ignition timing can be adjusted to reduce knock using information from knock sensors. In the impossible knock control region, increased noise and vibrations may make knock detection difficult, so adjustments to ignition timing for knock control may be based on estimated rather than measured values.

Britsch et al. (U.S. Pat. No. 4,542,727) is directed to an internal combustion engine operating control system and method. Britsch teaches a system where a standard or permissible knocking signal is generated by the control system and this signal is compared with a measured knocking signal. When the measured signal is above the permissible signal, some engine parameter such as air/fuel ratio, ignition timing or other parameter may be adjusted to reduce the knock. In some cases, the permissible knock signal may be modified according to an engine operating parameter, such as temperature or speed. Britsch teaches that the parameter could be engine speed, so that at low engine speed the permissible knocking signal could be modified to allow for greater knocking in the engine, since knocking is relatively harmless at low-speed conditions of the engine.

There is a need in the art for a system and method that addresses the shortcomings of the prior art discussed above.

SUMMARY OF THE INVENTION

A system and method for knock control is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, comprising: an engine associated with a knock control system configured to control the level of knock in the engine; a vehicle speed sensor; the knock control system including a first knock control setting that is associated with a first vehicle speed range and a second knock control setting that is associated with a second vehicle speed range; and where the first knock control setting is associated with a first predetermined noise level and wherein the second knock control setting is associated with a second predetermined noise level that is greater than the first predetermined noise level.

In another aspect, the knock control system includes a third knock control setting that is associated with a third vehicle speed range.

In another aspect, the third knock control setting is associated with a third predetermined noise level that is greater than the second predetermined noise level.

In another aspect, the knock control system includes more than three knock control settings.

In another aspect, the vehicle speed sensor is used to determine a current vehicle speed.

In another aspect, the first predetermined noise level is not audible over ambient noise associated with an interior of the motor vehicle when the current vehicle speed is the first vehicle speed range.

In another aspect, the second predetermined noise level is not audible over ambient noise associated with an interior of the motor vehicle when the current vehicle speed is in the second vehicle speed range.

In another aspect, the invention provides a motor vehicle, comprising: an engine associated with a knock control system configured to control a level of knock in the engine, the level of knock including an associated knock noise level; an ambient noise sensor configured to measure a current ambient noise level of the motor vehicle; and where the knock control system receives information from the ambient noise sensor related a current ambient noise level and selects a knock control setting associated with a predetermined knock noise level that is below the current ambient noise level.

In another aspect, the ambient noise sensor is a microphone associated with an interior portion of the motor vehicle.

In another aspect, the knock control system includes a knock sensor configured to determine a current knock noise level.

In another aspect, the knock control system includes two or more knock sensors configured to determine the current knock noise level.

In another aspect, the knock control system includes two or more knock control settings.

In another aspect, the knock control system decreases the knock control setting when the current knock noise level is below the current ambient noise level.

In another aspect, the knock control system increases the knock control setting when the current knock noise level is above the current ambient noise level.

In another aspect, the invention provides a motor vehicle, comprising: an engine associated with a knock control system configured to control a level of knock in the engine, the level of knock including an associated knock noise level; a vehicle speed sensor configured to determine a current vehicle speed; the knock control system using a map to obtain a retrieved ambient noise level according to the current vehicle speed; and where the knock control system selects a knock control setting with a knock noise level that is below the retrieved ambient noise level.

In another aspect, the knock control system includes a knock sensor that is used to determine the knock noise level.

In another aspect, the knock control system includes multiple knock sensors.

In another aspect, the map includes a set of ambient noise levels associated with a set of engine speed ranges.

In another aspect, the map includes an algorithm or function for determining the ambient noise level according to the current vehicle speed.

In another aspect, the knock noise level is a predetermined knock noise level associated with the knock control setting.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
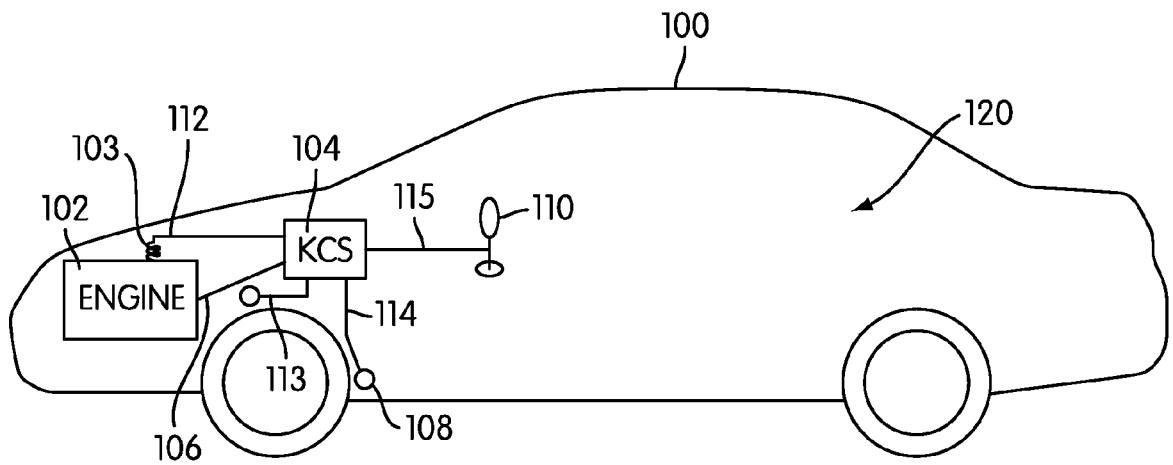
FIG. 1 is a schematic view of an embodiment of a motor vehicle.

FIG. 1 is a schematic view of an embodiment of motor vehicle 100. For purposes of illustration, motor vehicle 100 is shown as a sedan, however it should be understood that in other embodiments motor vehicle 100 could be any type of car, truck or other kind of vehicle.

Motor vehicle 100 may include engine 102. Engine 102 may be any type of engine and may include any number of cylinders. In some embodiments, motor vehicle 100 and engine 102 may be further associated with a power train system as well as other components necessary for a motor vehicle to operate. For clarity, only some components of motor vehicle 100 are shown in this schematic illustration.

In some embodiments, motor vehicle 100 includes provisions for reducing or eliminating knock in engine 102. In this embodiment, motor vehicle includes KCS (knock control system) 104. KCS 104 may be associated with an electronic control unit or an on-board computer of motor vehicle 100. In some embodiments, KCS 104 may be a subsystem of an electronic control unit. For example, in some embodiments, KCS 104 could be a software program installed within an electronic control unit that is configured to control all the systems and devices associated with motor vehicle 100. In other embodiments, KCS 104 may be a stand along system that may or may not communicate with an electronic control unit.

KCS 104 is in some embodiments in communication with various components of motor vehicle 100. In this embodiment, KCS 104 is in communication with engine 102, engine speed sensor 103, knock sensor 106, vehicle speed sensor 108 and ambient noise sensor 110 via first connection 111, second connection 112, third connection 113, fourth connection 114 and fifth connection 115, respectively. Generally, connections 111-115 may be any type of connections, including both wired and wireless connections. It should be understood that the components 106, 108 and 110 may be optional.

Knock sensor 106 may be configured to monitor knock levels within engine 102. In some embodiments, knock sensor 106 may be configured to detect if knock occurs as well as the level of knock occurring. Knock sensor 106 could also be configured to detect information related to noise and vibrations associated with knock in the engine. In this embodiment, knock sensor 106 is disposed adjacent to engine 102, however in other embodiments knock sensor 106 may be disposed anywhere within motor vehicle 100.

Although the current embodiment includes a single knock sensor, in other embodiments, more than one knock sensor may be used. In some cases, using multiple knock sensors may provide additional information that cannot be obtained using a single knock sensor. In other cases, using additional knock sensors may help provide more accurate results as information obtained by each knock sensor may be compared to information obtained from the other knock sensors. In some embodiments, each additional knock sensor may be in communication with a knock control system using various types of connections.

Engine speed sensor 103 is in some embodiments configured to measure a current engine speed. Engine speed sensor 103 is in some embodiments disposed within engine 102. In an embodiment, engine speed sensor 103 is a crank angle sensor that is associated with a crankshaft of engine 102.

Vehicle speed sensor 108 is in some embodiments configured to measure the current speed for motor vehicle 100. Vehicle speed sensor 108 may be located anywhere within motor vehicle 100. In an embodiment, vehicle speed sensor 108 may be associated with an axle of motor vehicle 100.

Ambient noise sensor 110 is in some embodiments configured to measure ambient noise associated with wind noise, road noise, tire noise and other types of noises associated with the operation of motor vehicle 100. In some embodiments, ambient noise sensor 110 may be disposed within cabin 120 of motor vehicle 100. This arrangement allows ambient noise sensor 110 to measure noises that would be heard by a driver and/or passengers within cabin 120. Generally, ambient noise sensor 110 could be disposed anywhere within motor vehicle 100. In an alternative embodiment, ambient noise sensor 110 may be disposed adjacent to engine 102.

Typically, knock control systems adjust various operating parameters within an engine in order to reduce knock below an acceptable level. In many cases, knock control systems use ignition timing retard to reduce or substantially eliminate knock. However, using ignition timing retard can reduce fuel efficiency in an engine. Because increased knock control may be associated with increased ignition timing retard, increased knock control may therefore also reduce fuel efficiency in an engine.

Figure 2:
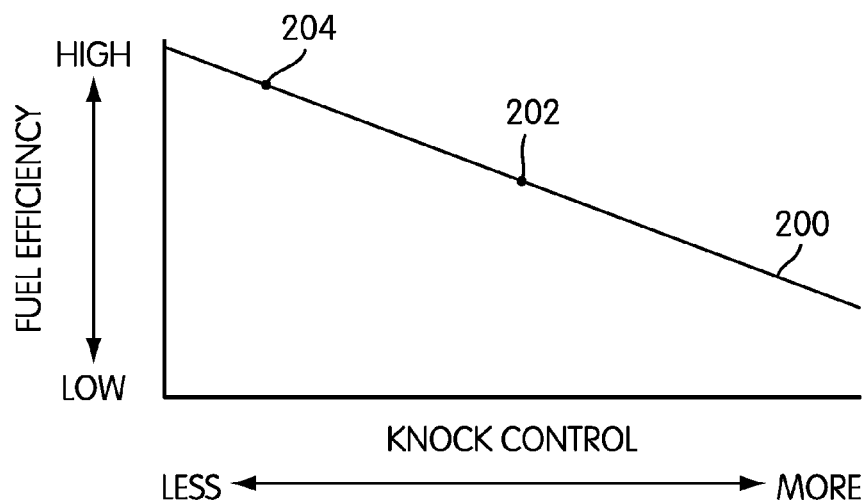
FIG. 2 is an embodiment of a relationship between the amount of knock control and fuel efficiency in the engine.

FIG. 2 illustrates an embodiment of a relationship between the amount of knock control and fuel efficiency in the engine. In this embodiment, fuel efficiency curve 200 is clearly seen to decrease with increased knock control. It should be understood that the relationship illustrated here is simplified for clarity. In other embodiments, the relationship between knock control and fuel efficiency may be much more complicated, though an overall decrease in fuel efficiency with increased knock control may still hold.

Knock control is often implemented to protect the engine from excessive knock, as well as to limit noise and/or vibrations experienced by a driver and passengers that are a result of engine knocking. While damage to an engine from knock is an important consideration at high engine speeds, at low engine speeds, knock may not result in significant damage to an engine. In other words, the need for knock control for engine protection at low engine speeds is low. However, even at low engine speeds, knock can produce significant noise and/or vibrations that are undesirable to a driver and passengers.

Figure 3:
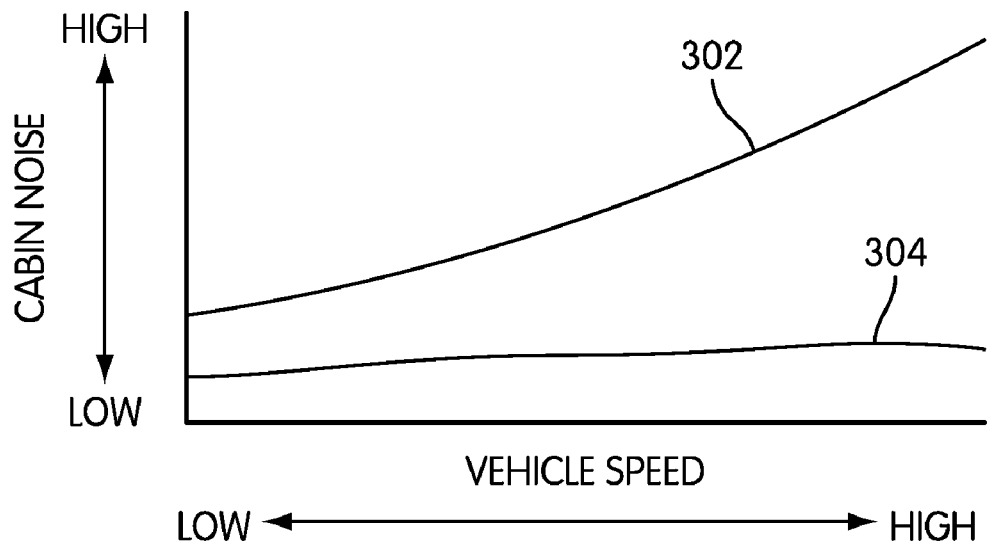
FIG. 3 is an exemplary embodiment of a relationship between vehicle speed and cabin noise.

FIG. 3 is an exemplary embodiment of a relationship between vehicle speed and cabin noise. The term 'cabin noise' refers to any noise that is experienced by a driver or passenger within the cabin of motor vehicle 100. For purposes of clarity, the term 'noise' is used here and throughout the rest of this detailed description and the claims to refer to both audible noise and mechanical vibrations that occur within motor vehicle 100.

In this embodiment, noises within motor vehicle 100 are separated into ambient noises and noises due to knock only. As previously discussed, ambient noise includes wind noise, road noise, tire noise as well as other types of noises. In this embodiment, ambient noise curve 302 is seen to increase with increasing vehicle speeds. This is due to increases in wind noise, road noise, tire noise and other noises associated with motor vehicle 100. Knock noise curve 304, however, remains generally steady as vehicle speed increases. This is due to the fact that most knock control systems are set to maintain knock below a constant threshold that does not vary with speed. In other words, the knock control setting remains substantially constant with speed, and therefore the noise due to knock will also remain substantially constant with speed.

Figure 4:
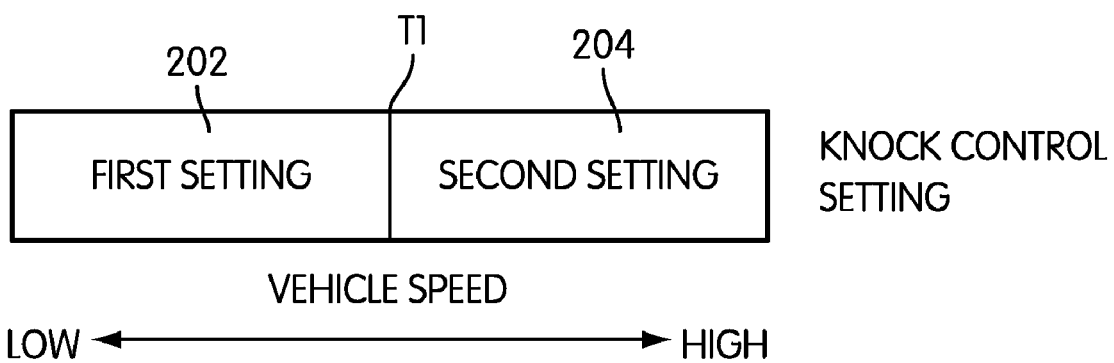
FIG. 4 is an embodiment of a relationship between vehicle speed and knock control settings.

Referring to FIG. 4, KCS 104 in some embodiments includes provisions decreasing knock control in some situations in order to increase fuel efficiency. In particular, at high vehicle speeds knock control may be reduced (allowing for increased knock). In this embodiment, KCS 104 may be configured to use first knock control setting 202 at vehicle speeds below threshold speed T1. KCS 104 may also use second knock control setting 204 at vehicle speeds at or above threshold speed T1. A first vehicle speed range is defined by vehicle speeds below threshold speed T1 and a second vehicle speed range is defined by vehicle speeds above threshold speed T1. Referring back to FIG. 2, first knock control setting 202 is associated with a greater amount of knock control than second knock control setting 204. In other words, first knock control setting 202 maintains lower levels of knock than second knock control setting 204. Because of this, second knock control setting 204 provides greater fuel efficiency over first knock control setting 202.

Figure 5:
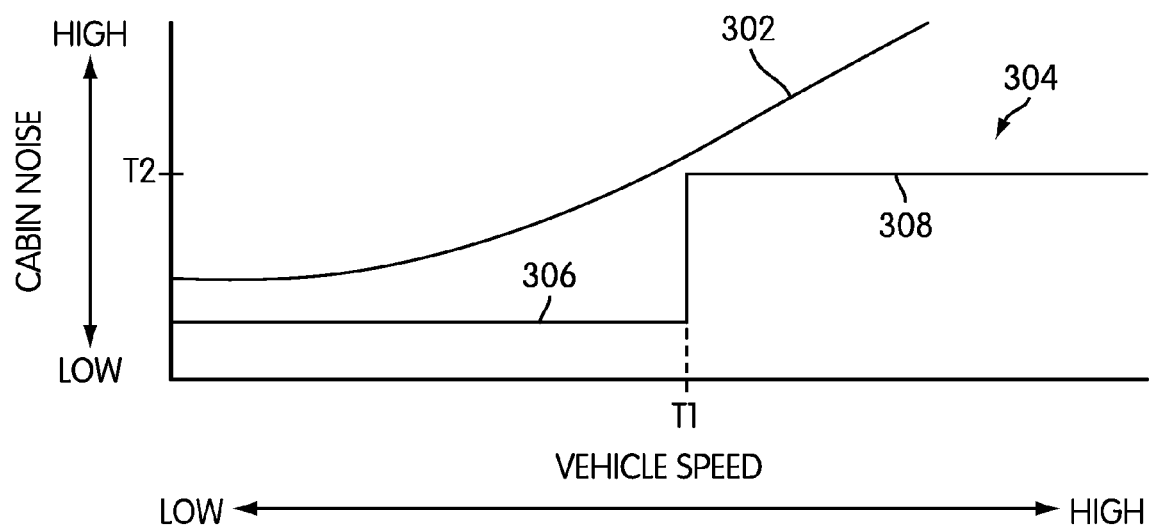
FIG. 5 is an embodiment of a relationship between vehicle speed and cabin noise with two different knock control settings.

FIG. 5 illustrates an embodiment of the relationship between vehicle speed and cabin noise using two different knock control settings. As previously discussed, ambient noise curve 302 generally increases with vehicle speed. In this embodiment, knock noise curve 304 may comprise first curve portion 306 and second curve portion 308. First curve portion 306 is in some embodiments associated with first knock control setting 202 and second curve portion 308 is in some embodiments associated with second knock control setting 204. First knock control setting 202 may be associated with a first predetermined noise level and second knock control setting 204 may be associated with a second predetermined noise level that are represented by first curve portion 306 and second curve portion 398, respectively. It is clear that the second predetermined noise level is greater than the first predetermined noise level. In other words, second knock control setting 204 is 'noisier' than first knock control setting 202.

As seen in this embodiment, although the noise due to using second knock control setting 204 is increased, knock noise curve 304 remains below ambient noise curve 302 for all engine speeds. With this configuration, the driver or passengers will in some embodiments not notice the increased noise from knock because it is 'covered' by increased ambient noises. Furthermore, by allowing for increased knock at high vehicle speeds, fuel efficiency for motor vehicle 100 is increased.

Generally, first knock control setting 202 and second knock control setting 204 may be preset during manufacturing. In some embodiments, the amount of knock that occurs during first knock control setting 202 and second knock control setting 204 may be adjusted so that the noise produced from knock never rises above the ambient noise levels. The settings may be configured during road tests to determine optimum knock levels for each control setting 202 and 204. In some cases, control settings 202 and 204 may be adjusted for maximum fuel efficiency. For example, some drivers may be willing to tolerate some knock noise above ambient noise levels in order to achieve increased fuel efficiency. Other drivers, however, may want noise from knock to be far below ambient noise levels even if some fuel efficiency is lost.

Figure 6:
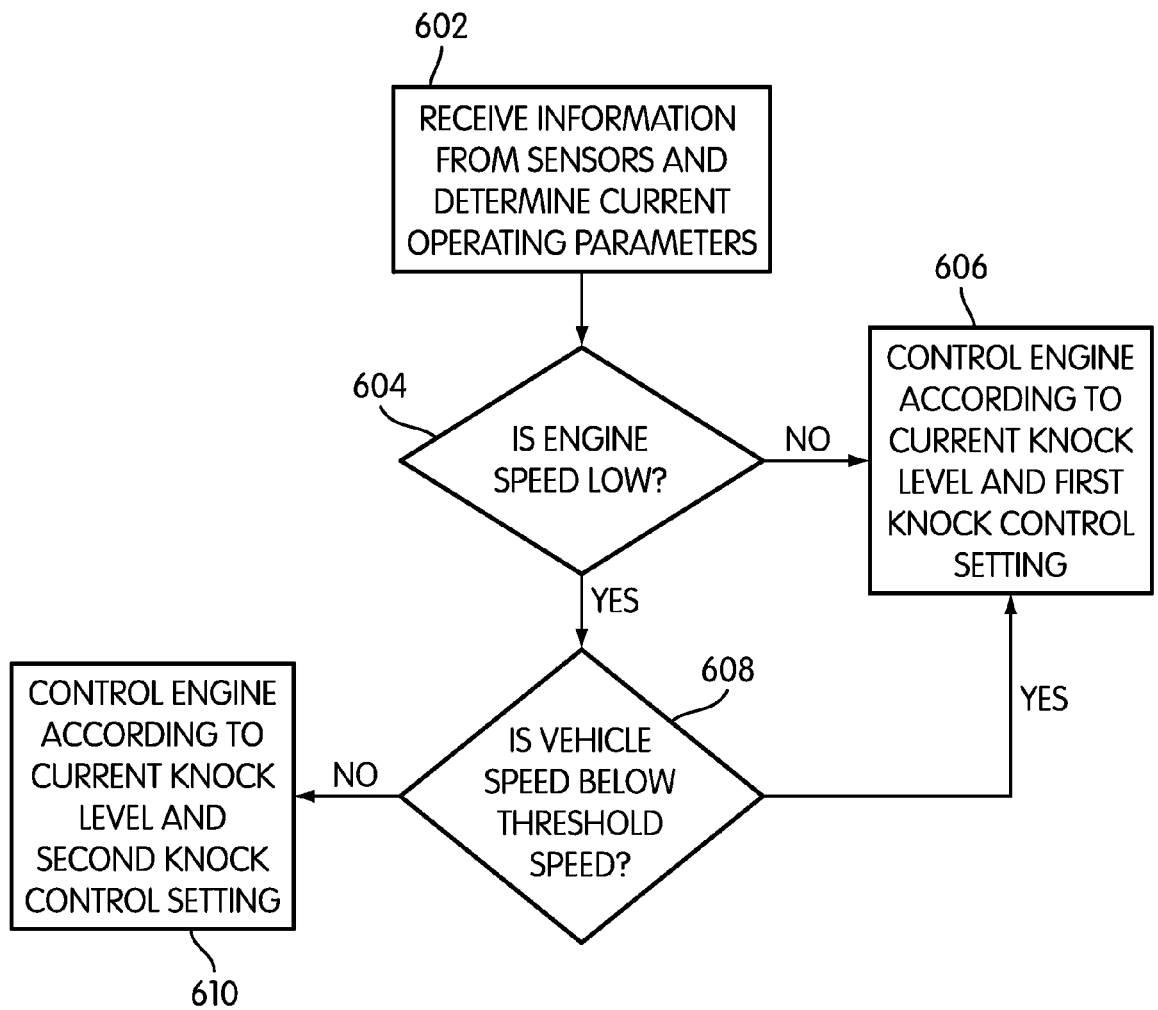
FIG. 6 is an embodiment of a process for operating an engine using various knock control settings.

FIG. 6 is an embodiment of a process for operating an engine using various knock control settings. In this embodiment, the following steps are in some embodiments performed by KCS 104, however in some embodiments these steps may be performed by additional systems or devices associated with motor vehicle 100 and engine 102.

During first step 602, KCS 104 in some embodiments receives information from one or more sensors. In an embodiment, KCS 104 may receive information from engine speed sensor 103, knock sensor 106 and vehicle speed sensor 108. In other embodiments, KCS 104 may receive information from additional sensors as well, including ambient noise sensor 110 or other sensors. Also, during first step 602, KCS 104 in some embodiments determines various current operating parameters according to information received from sensors 103, 106 and 108. In particular, KCS 104 may determine a current engine speed, a current knock level and a current vehicle speed according to information received from engine speed sensor 103, knock sensor 106 and vehicle speed sensor 108, respectively.

Following first step 602, KCS 104 in some embodiments proceeds to second step 604. During second step 604, KCS 104 may determine if the current engine speed is low. If the engine speed is not low, KCS 104 may proceed to third step 606. During third step 606, KCS 104 may control engine 102 according to the current knock level and first knock control setting 202 in order to maintain reduced knock and prevent damage to engine 102 at high engine speeds.

If, during second step 604, KCS 104 determines that the engine speed is low, KCS 104 may proceed to fourth step 608. During fourth step 608, KCS 104 in some embodiments determines if the current vehicle speed is below threshold speed T1. If the current vehicle speed is below threshold speed T1, KCS 104 in some embodiments proceeds to step 606, which has been previously discussed. If, during step 608, KCS 104 determines that the current vehicle speed is above threshold speed T1, KCS 104 in some embodiments proceeds to step 610. During step 610, KCS 104 may control engine 102 according to the current knock level and second knock control setting 204. This arrangement allows for increased fuel efficiency by reducing knock control.

In the current embodiment, vehicle speed has been used as a proxy for ambient noise. In other words, ambient noise generally increases with vehicle speed in a predictable way, allowing vehicle speed to be used as an indicator as to the level of ambient noise. For example, during the manufacturing process, KCS 104 may be programmed with threshold speed T1 that is associated with increased ambient noise as measured during road tests. This is a useful configuration because many motor vehicles are already equipped with vehicle speed sensors. Therefore, in the current embodiment, no additional devices are needed to measure ambient noise.

In another embodiment, it may be useful to measure ambient noise directly. In some embodiments, as previously discussed, motor vehicle 100 includes ambient noise sensor 110. Ambient noise sensor 110 may be configured to measure ambient noise within cabin 120 or elsewhere within motor vehicle 100.

Figure 7:
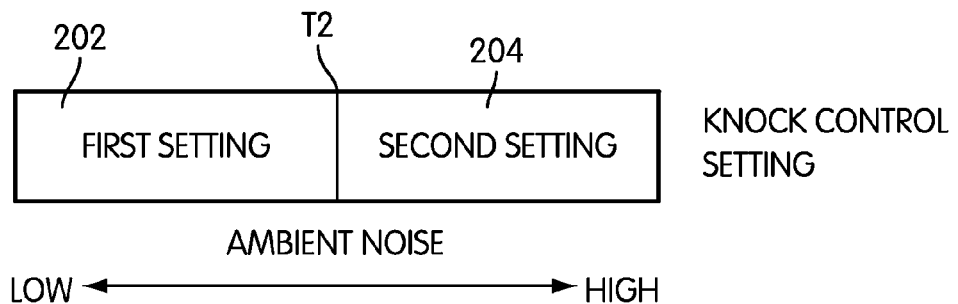
FIG. 7 is an embodiment of a relationship between ambient noise and a knock control settings.

Referring to FIG. 7, whenever the current ambient noise level measured by ambient noise sensor 110 is above a threshold noise level T2, second knock control setting 204 may be used. When the current ambient noise level measured by ambient noise sensor 110 is below threshold noise level T2, first knock control setting 202 may be used. In some embodiments, as seen in FIG. 5, threshold noise level T2 corresponds to a level of ambient noise that is above the second predetermined knock noise level which occurs when second knock control setting 204 is used.

Figure 8:
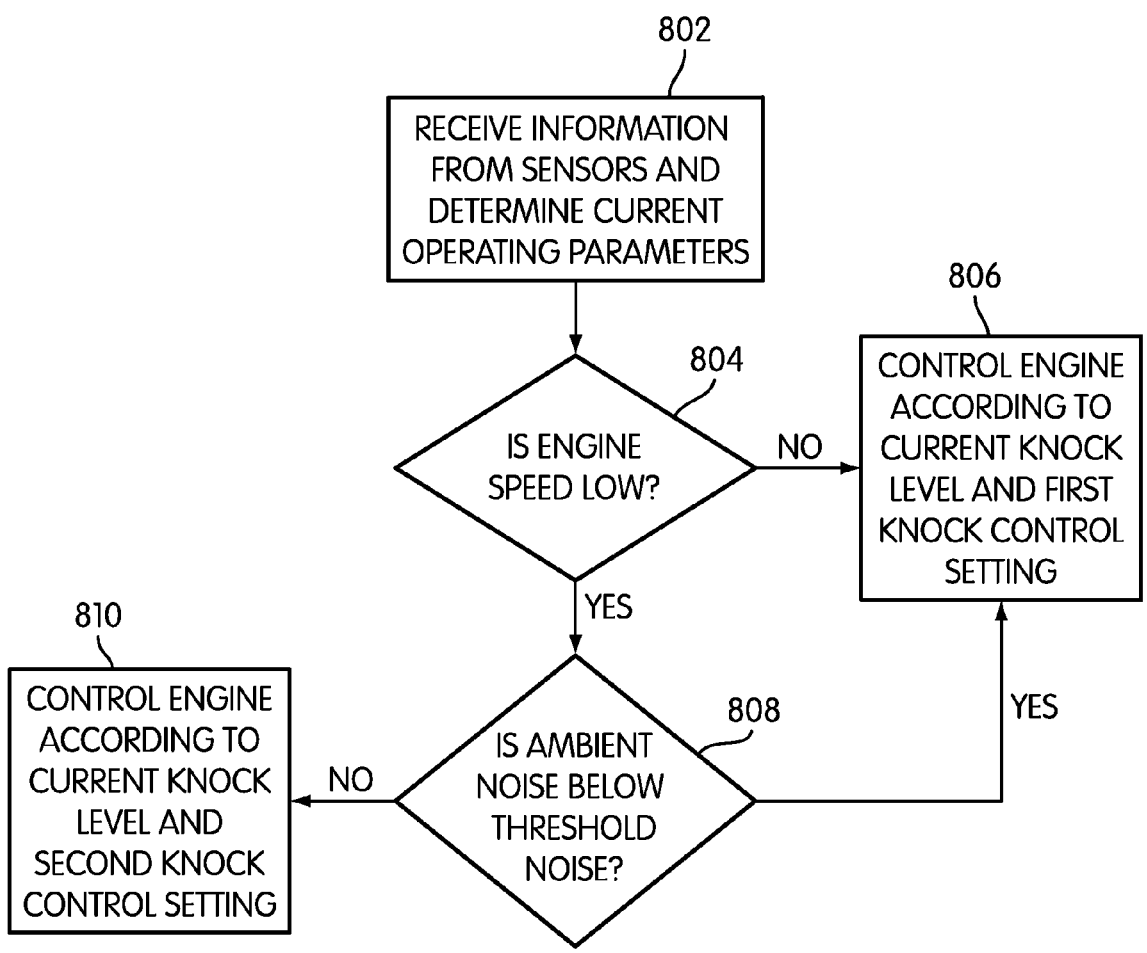
FIG. 8 is an embodiment of a process for operating an engine using two knock control settings.

FIG. 8 is an embodiment of a process for operating an engine using two knock control settings. In this embodiment, the following steps are in some embodiments performed by KCS 104, however in some embodiments these steps may be performed by additional systems or devices associated with motor vehicle 100 and engine 102.

During first step 802, KCS 104 in some embodiments receives information from one or more sensors. In an embodiment, KCS 104 may receive information from engine speed sensor 103, knock sensor 106 and ambient noise sensor 110. Also, during first step 802, KCS 104 in some embodiments determines various current operating parameters according to information received from sensors 103, 106 and 110. In particular, KCS 104 may determine a current engine speed, a current knock level and a current ambient noise level according to information received from engine speed sensor 103, knock sensor 106 and ambient noise sensor 110, respectively.

Following first step 802, KCS 104 in some embodiments proceeds to second step 804. During second step 804, KCS 104 may determine if the current engine speed is low. If the engine speed is not low, KCS 104 may proceed to third step 806. During third step 806, KCS 104 may control engine 102 according to the current knock level and first knock control setting 202 in order to maintain reduced knock and prevent damage to engine 102 at high engine speeds.

If, during second step 804, KCS 104 determines that the engine speed is low, KCS 104 may proceed to fourth step 808. During fourth step 808, KCS 104 in some embodiments determines if the current ambient noise level is below threshold noise level T2. If the current ambient noise level is below threshold noise level T2, KCS 104 in some embodiments proceeds to step 806, which has been previously discussed. If, during step 808, KCS 104 determines that the current ambient noise level is above threshold noise level T2, KCS 104 in some embodiments proceeds to step 810. During step 810, KCS 104 may control engine 102 according to the current knock level and second knock control setting 204. This arrangement allows for increased fuel efficiency by reducing knock control when the ambient noise level is above the second predetermined knock noise level associated with second knock control setting 204.

Figure 9:
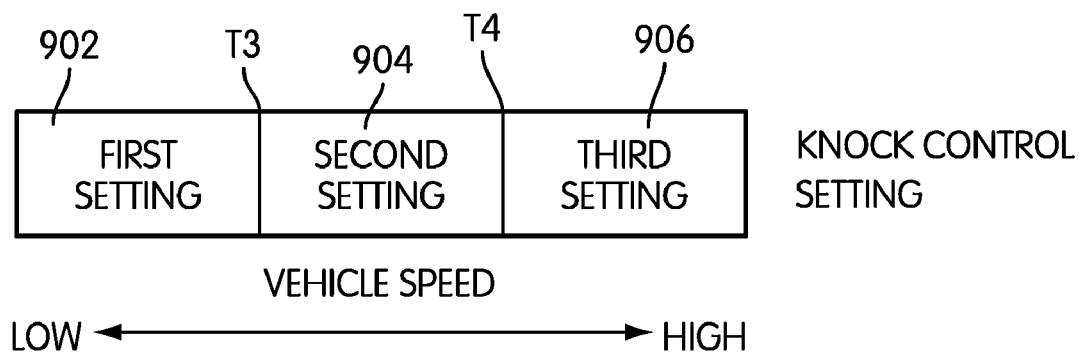
FIG. 9 is an embodiment of a relationship between vehicle speed and knock control settings.
Figure 10:
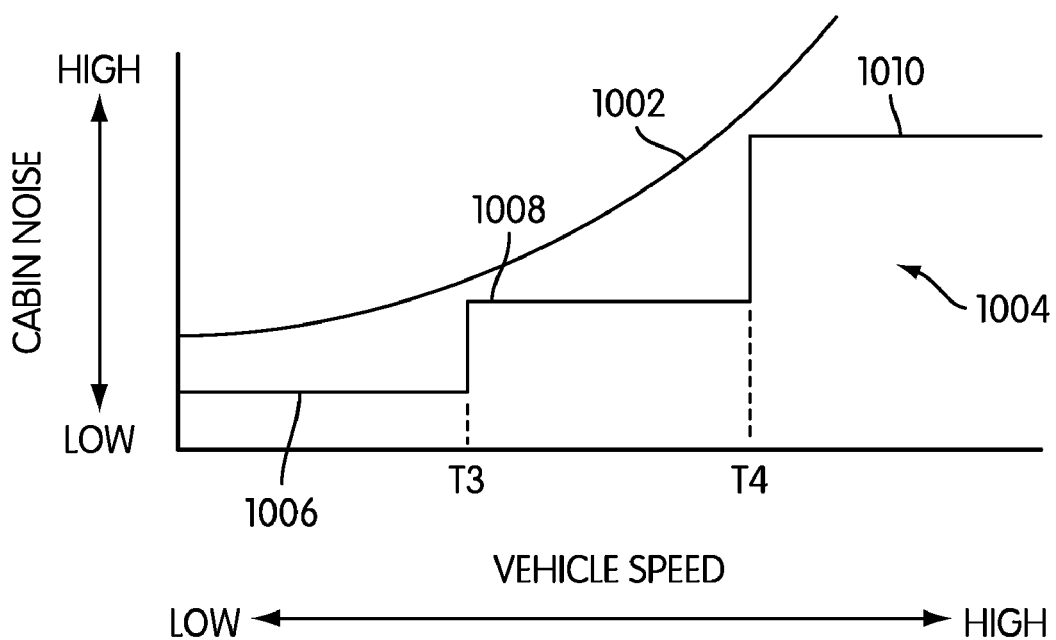
FIG. 10 is an embodiment of a relationship between vehicle speed and cabin noise with three different knock control settings.
Figure 11:
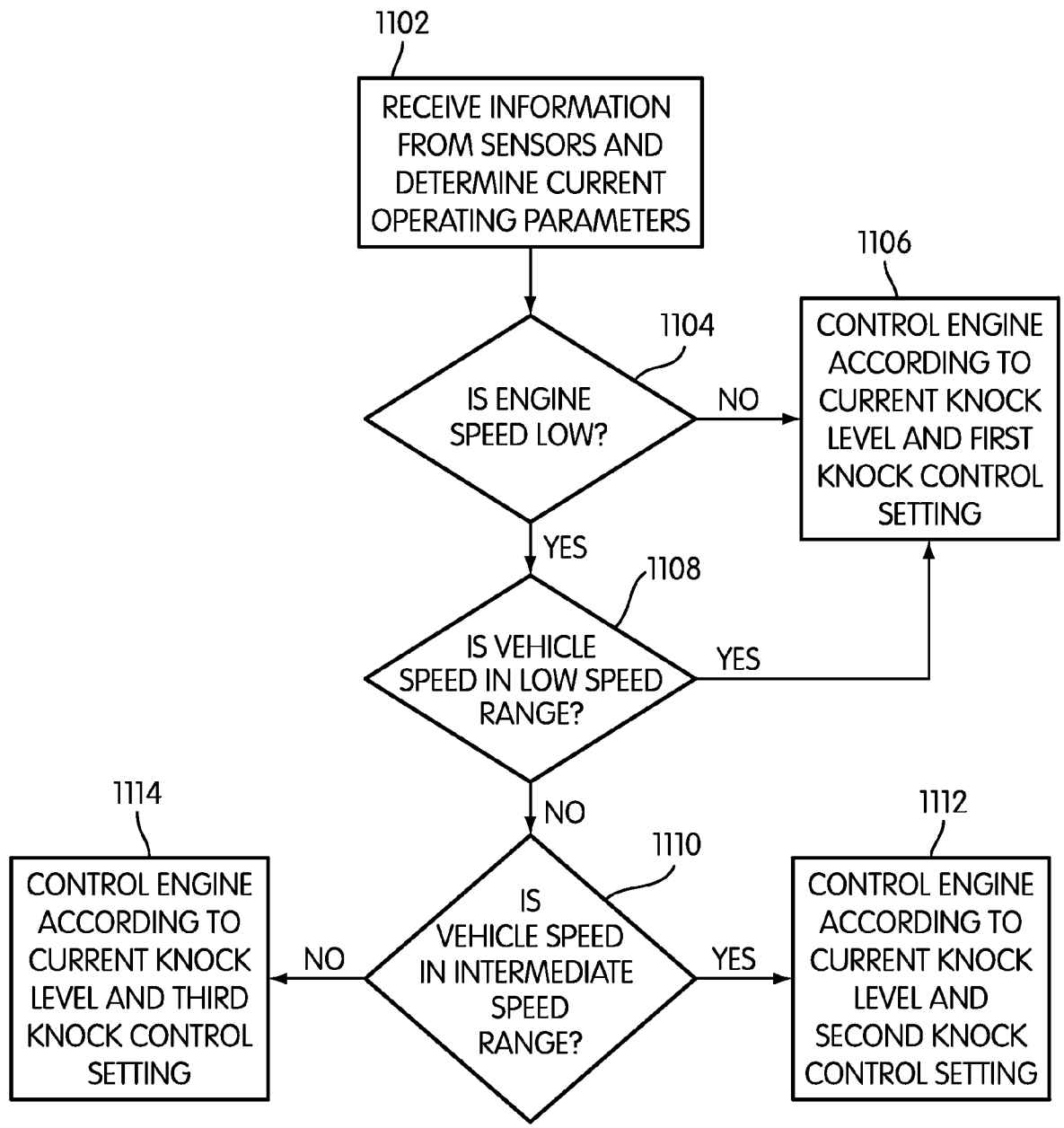
FIG. 11 is an embodiment of a process for operating an engine using multiple knock control settings.

Referring to FIGS. 9-11, in some embodiments more than two knock control settings could be used. In this alternative embodiment, three knock control settings may be used. FIG. 9 is an embodiment of a relationship between a knock control setting and vehicle speed. In some embodiments, first knock control setting 902, second knock control setting 904 and third knock control setting 906 are used. First knock control setting 902 may be used when the current vehicle speed is below threshold vehicle speed T3. Second knock control setting 904 may be used when the current vehicle speed is between threshold vehicle speeds T3 and T4. Third knock control setting 906 may be used when the current vehicle speed is above threshold vehicle speed T4.

As seen in FIG. 10, the noise levels associated with knock control settings 902, 904 and 906 are in some embodiments less than the ambient noise at all vehicle speeds. In this embodiment, first portion 1006, second portion 1008 and third portion 1010 of knock noise curve 1004 are associated with first knock control setting 902, second knock control setting 904 and third knock control setting 906, respectively. First portion 1006, second portion 1008 and third portion 1010 all remain below ambient noise curve 1002 for all vehicle speeds.

FIG. 11 is an embodiment of a process for operating engine 102 using multiple knock control settings. In this embodiment, the following steps are in some embodiments performed by KCS 104, however in some embodiments these steps may be performed by additional systems or devices associated with motor vehicle 100 and engine 102.

During first step 1102, KCS 104 in some embodiments receives information from one or more sensors. In an embodiment, KCS 104 may receive information from engine speed sensor 103, knock sensor 106 and vehicle speed sensor 108. In other embodiments, KCS 104 may receive information from additional sensors as well, including ambient noise sensor 110 or other sensors. Also, during first step 1102, KCS 104 in some embodiments determines various current operating parameters according to information received from sensors 103, 106 and 108. In particular, KCS 104 may determine a current engine speed, a current knock level and a current vehicle speed according to information received from engine speed sensor 103, knock sensor 106 and vehicle speed sensor 108, respectively.

Following first step 1102, KCS 104 in some embodiments proceeds to second step 1104. During second step 1104, KCS 104 may determine if the current engine speed is low. If the engine speed is not low, KCS 104 may proceed to third step 1106. During third step 1106, KCS 104 may control engine 102 according to the current knock level and first knock control setting 902 in order to maintain reduced knock and prevent damage to engine 102 at high engine speeds.

If, during second step 1104, KCS 104 determines that the engine speed is low, KCS 104 may proceed to fourth step 1108. During fourth step 1108, KCS 104 in some embodiments determines if the current vehicle speed is in a low vehicle speed range that is associated with vehicle speeds below threshold vehicle speed T3. If the current vehicle speed is below threshold speed T3, KCS 104 in some embodiments proceeds to step 1106, which has been previously discussed. If, during step 1108, KCS 104 determines that the current vehicle speed is not in the low vehicle speed range, KCS 104 in some embodiments proceeds to step 1110. During step 1110, KCS 104 may determine if the current vehicle speed is in an intermediate speed range that is defined as the speeds between threshold vehicle speed T3 and threshold vehicle speed T4. If the current speed is in the intermediate speed range, KCS 104 in some embodiments proceeds to step 1112. During step 1112, KCS 104 in some embodiments controls engine 102 according to the current knock level and second knock control setting 904. This arrangement allows for increased fuel efficiency by moderately reducing knock control.

If, during step 1110, KCS 104 determines that the current vehicle speed is not in the intermediate vehicle speed range, KCS 104 proceeds to step 1114. During step 1114, KCS 104 in some embodiments controls engine 102 according to the current knock level and third knock control setting 906. In some embodiments, third knock control setting 906 allows for more knock than second knock control setting 904 and therefore allows for increased fuel efficiency over intermediate knock control setting 904.

Although this embodiment includes using various knock control settings according to vehicle speed, in other embodiments three or more knock control settings could be used in systems that use an ambient noise sensor to measure noise rather than switching knock control settings according to vehicle speed. Additionally, any number of knock control settings could be used according to vehicle speed and/or directly measured ambient noise levels. In some embodiments, for example, a continuous setting of knock control levels could be employed that would allow for any knock control setting.

In the previous embodiments, the amount of noise generated by knock in the engine for various knock control settings was assumed to be constant and known prior to operation of the engine. In some cases, it may be useful to include real time measurements of noise due to knock in the engine, in order to compare that noise with ambient noise levels.

Figure 12:
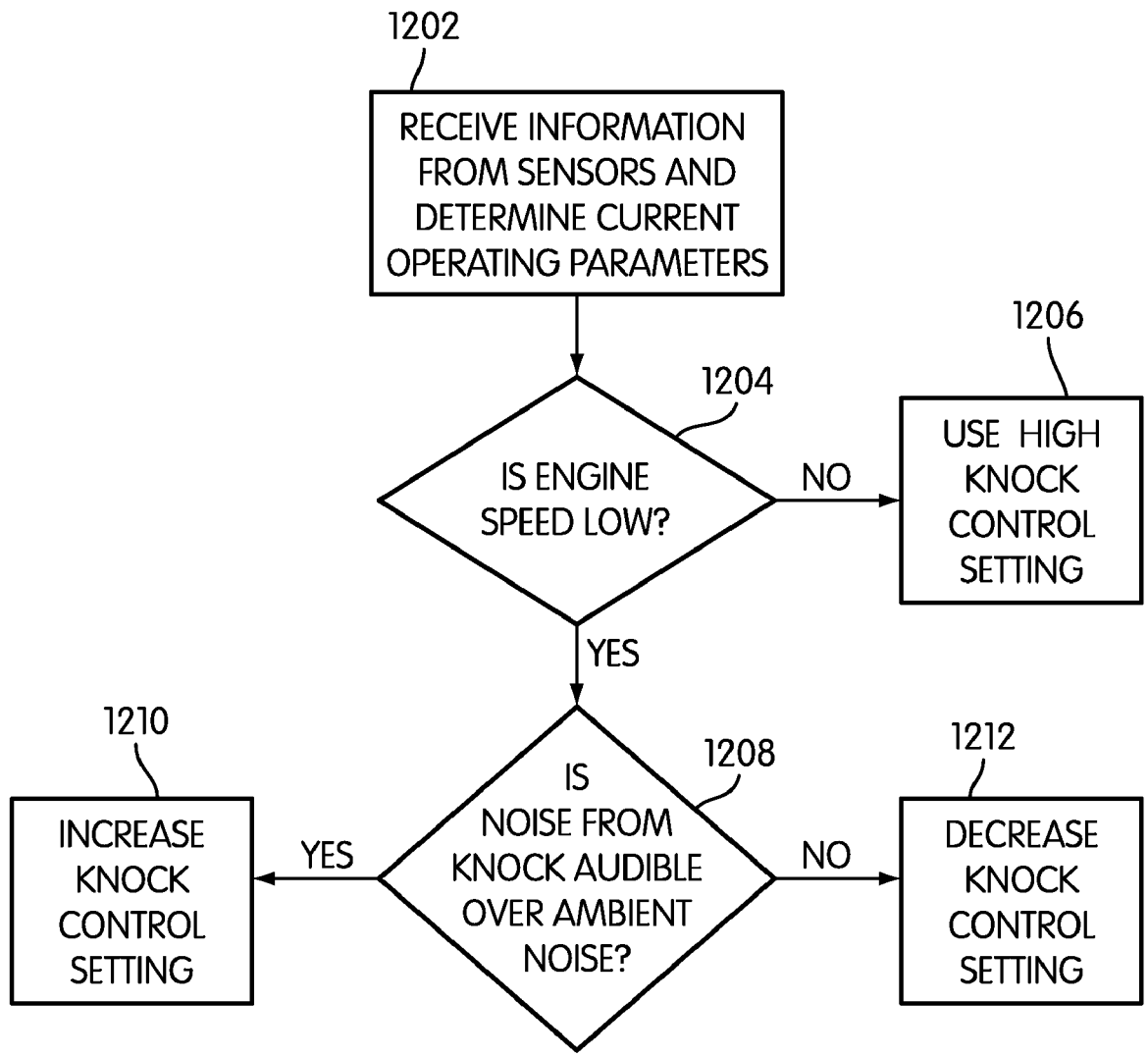
FIG. 12 is an embodiment of a process for operating an engine using multiple knock control settings.

FIG. 12 is an embodiment of a process for operating an engine using multiple knock control settings. In this embodiment, KCS 104 is in some embodiments configured to directly measure noise due to knock in engine 102. This may be achieved by using knock sensor 106 or an additional noise sensor that is configured to distinguish noise due to knock from ambient noise.

During first step 1202, KCS 104 in some embodiments receives information from one or more sensors, including engine speed sensor 103, knock sensor 106 and ambient noise sensor 110. In some embodiments, KCS 104 may receive information from additional sensors, including vehicle speed sensor 108 as well as additional noise sensors. At this point, KCS 104 may determine current operating parameters. These parameters in some embodiments include a current engine speed a current knock level, a current ambient noise level and a current knock noise level.

Following first step 1202, KCS 104 in some embodiments proceeds to second step 1204. During second step 1204, KCS 104 may determine if the current engine speed is low. If the engine speed is not low, KCS 104 may proceed to third step 1206. During third step 1206, KCS 104 may control engine 102 according to the current knock level and a high knock control setting in order to maintain reduced knock and prevent damage to engine 102 at high engine speeds.

If, during second step 1204, KCS 104 determines that the engine speed is low, KCS 104 may proceed to fourth step 1208. During fourth step 1208, KCS 104 may compare the current knock noise level with the current ambient noise level. If the current knock noise level is greater than the current ambient noise level, KCS 104 may proceed to fifth step 1210. During fifth step 1210, KCS 104 may increase the current knock control setting. With this increase in the current knock setting, the noise from knock will in some embodiments drop below the ambient noise. This configuration allows for driver and passenger satisfaction since they do not hear noises from knock.

If, during fourth step 1208, KCS 104 determines that the current knock noise level is less than the current ambient noise level, KCS 104 in some embodiments proceeds to sixth step 1212. During step 1212, KCS 104 may decrease the current knock control setting, which allows for increased knock and therefore increased fuel efficiency. It should be understood that both steps 1210 and 1212 may include sub steps of checking to see if it is possible to increase or decrease knock control settings. For example, if KCS 104 is already set to the lowest knock control setting it is not possible to decrease the knock control settings anymore, and therefore KCS 104 would simply maintain the current knock control setting.

The knock control settings used in this embodiment could be continuous in some embodiments. In other embodiments, there could a discrete number of knock control settings, including two settings, three settings or any fixed number of settings.

Figure 13:
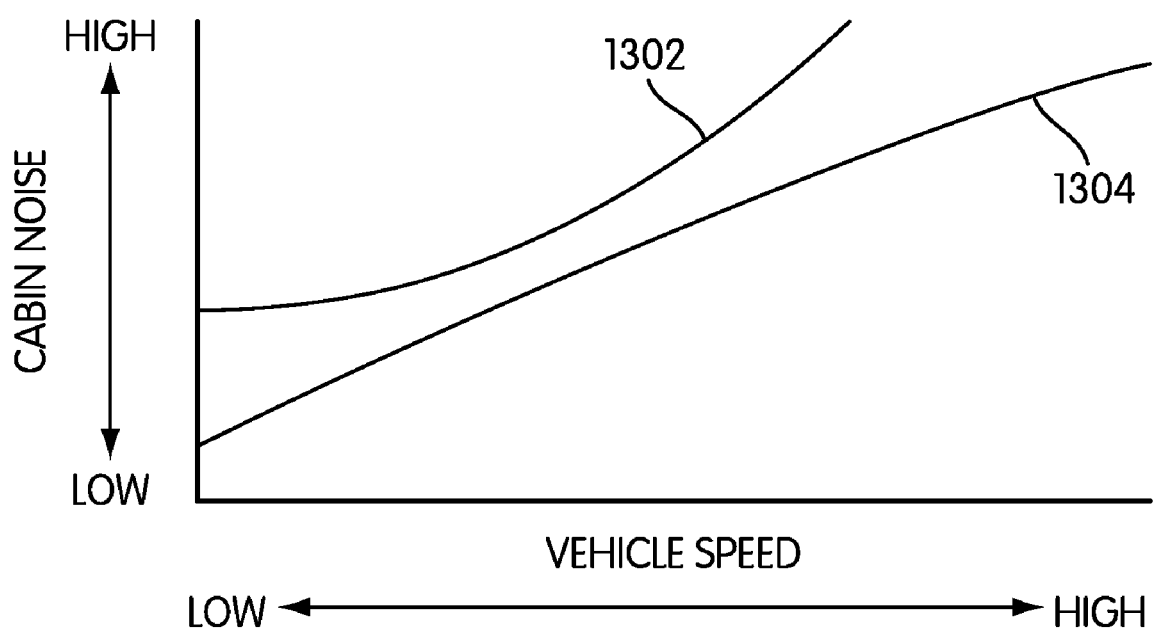
FIG. 13 is an embodiment of a relationship between ambient noise and noise due to knock.

FIG. 13 is an embodiment of a relationship between ambient noise and noise due to knock. Ambient noise curve 1302 is in some embodiments always above knock noise curve 1304. This prevents the driver or passengers from experiencing discomfort from excessive noise due to knocking in the engine. Additionally, because knock is allowed to increase with increasing ambient noise, fuel efficiency is gained at higher vehicle speeds.

In the previous embodiments, a current ambient noise level was determined using an ambient noise sensor. In some embodiments, in other embodiments, KCS 104 includes provisions for precisely calculating a current ambient noise level from the current vehicle speed, rather than using an ambient noise sensor to measure current noise levels. In an embodiment, KCS 104 may include an internal database or map that may include stored values of ambient noise as a function of vehicle speed.

Figure 14:
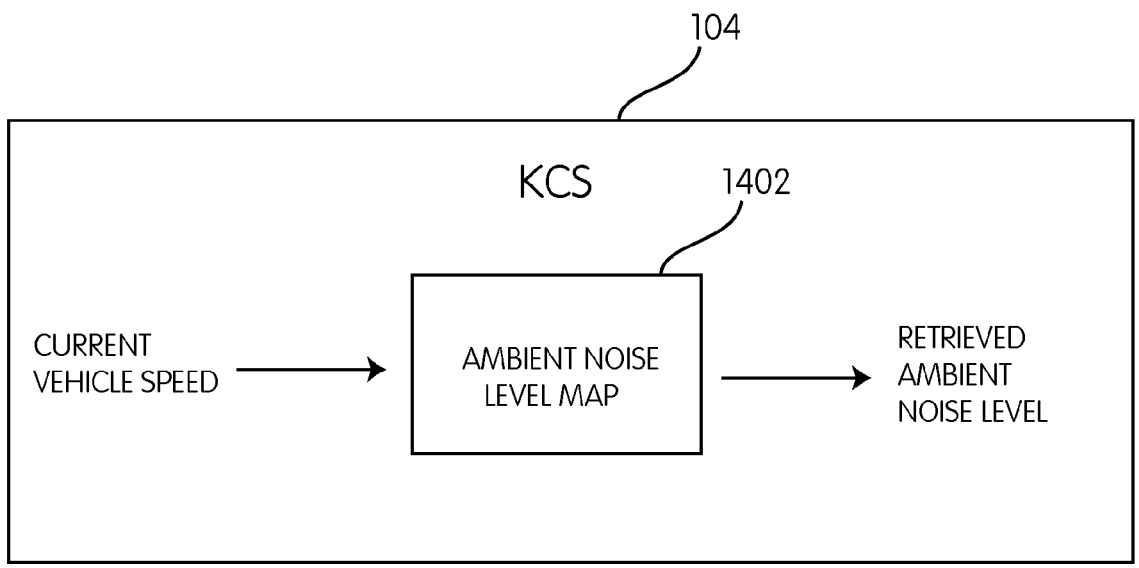
FIG. 14 is an embodiment of a knock control system with a map for obtaining an ambient noise level.

Referring to FIG. 14, KCS 104 may be associated with ambient noise level map 1402. In some embodiments, a current vehicle speed is determined using vehicle speed sensor 108. The current vehicle speed is then used as an input in ambient noise map 1402. Map 1402 in some embodiments includes stored ambient noise values as a function of vehicle speed. In some embodiments, map 1402 produces a retrieved ambient noise level as an output which is used by KCS 104.

In the current embodiment, map 1402 is a database or function within KCS 104. In some embodiments, map 1402 could be an algorithm used to calculate an ambient noise level according to the current vehicle speed. In other embodiments, map 1402 could be a separate database or function used to determine ambient noise levels according to vehicle speed. Using this configuration, KCS 104 may obtain a current ambient noise level in order to determine a knock control setting.

Figure 15:
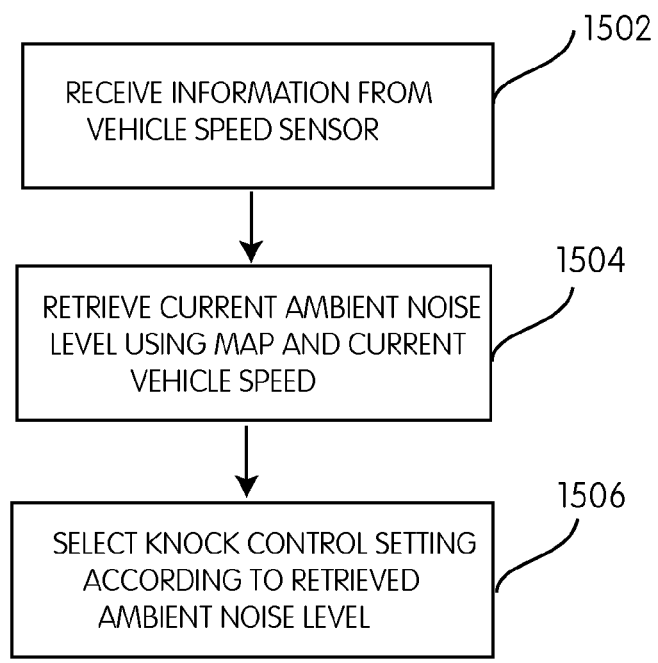
FIG. 15 is an embodiment of a process for controlling a knock control system.

Once KCS 104 has a retrieved ambient noise level, the process of selecting a knock control setting may proceed as in the previous embodiments. FIG. 15 is an embodiment of an exemplary process for controlling KCS 104 using map 1402. During first step 1502, KCS 104 may receive a current vehicle speed. Next, during second step 1504, KCS 104 may obtain a retrieved ambient noise level using map 1402 and the current vehicle speed. Finally, during third step 1506, KCS 104 may select a knock control setting with a knock noise level that is below the retrieved ambient noise level. Using this configuration, KCS 104 may determine a current ambient noise level without the use of an additional ambient noise sensor which may reduce manufacturing costs.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A motor vehicle, comprising:
an engine associated with a knock control system configured to control the level of knock in the engine;
a vehicle speed sensor;
an ambient noise sensor configured to measure a current ambient noise level of the motor vehicle, the ambient noise sensor including a microphone disposed within a passenger cabin of the motor vehicle;
the knock control system including a first knock control setting that is associated with a first vehicle speed range and a second knock control setting that is associated with a second vehicle speed range;
wherein the first knock control setting is associated with a first predetermined noise level and wherein the second knock control setting is associated with a second predetermined noise level that is greater than the first predetermined noise level.

2. The motor vehicle according to claim 1, wherein the knock control system includes a third knock control setting that is associated with a third vehicle speed range.

3. The motor vehicle according to claim 2, wherein the third knock control setting is associated with a third predetermined noise level that is greater than the second predetermined noise level.

4. The motor vehicle according to claim 1, wherein the knock control system includes more than three knock control settings.

5. The motor vehicle according to claim 4, wherein the vehicle speed sensor is used to determine a current vehicle speed.

6. The motor vehicle according to claim 5, wherein the first predetermined noise level is not audible over the current ambient noise level when the current vehicle speed is the first vehicle speed range.

7. The motor vehicle according to claim 6, wherein the second predetermined noise level is not audible over the current ambient noise level when the current vehicle speed is in the second vehicle speed range.

8. A motor vehicle, comprising:
an engine associated with a knock control system configured to control a level of knock in the engine, the level of knock including an associated knock noise level;
an ambient noise sensor configured to measure a current ambient noise level of the motor vehicle;
wherein the knock control system receives information from the ambient noise sensor related to a current ambient noise level and selects a knock control setting associated with a predetermined knock noise level that is below the current ambient noise level; and
wherein the ambient noise sensor is a microphone disposed within a passenger cabin of the motor vehicle.

9. The motor vehicle according to claim 8, wherein the knock control system includes an engine speed sensor configured to measure an engine speed of the motor vehicle; and wherein the knock control system is configured to select a high knock control setting when the engine speed is associated with a high value.

10. The motor vehicle according to claim 8, wherein the knock control system includes a knock sensor configured to determine a current knock noise level.

11. The motor vehicle according to claim 10, wherein the knock control system includes two or more knock sensors configured to determine the current knock noise level.

12. The motor vehicle according to claim 10, wherein the knock control system includes two or more knock control settings.

13. The motor vehicle according to claim 12, wherein the knock control system decreases the knock control setting when the current knock noise level is below the current ambient noise level.

14. The motor vehicle according to claim 13, wherein the knock control system increases the knock control setting when the current knock noise level is above the current ambient noise level.

* * * * *